US011113045B2

(12) United States Patent
Schneider

(10) Patent No.: US 11,113,045 B2
(45) Date of Patent: *Sep. 7, 2021

(54) IMAGE INSTALL OF A NETWORK APPLIANCE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/620,107

(22) Filed: Sep. 14, 2012

(65) Prior Publication Data

US 2013/0014098 A1 Jan. 10, 2013

Related U.S. Application Data

(63) Continuation of application No. 12/156,248, filed on May 29, 2008, now Pat. No. 8,418,164.

(51) Int. Cl.
*G06F 9/445* (2018.01)
*G06F 8/61* (2018.01)
*G06F 8/65* (2018.01)

(52) U.S. Cl.
CPC .............. *G06F 8/63* (2013.01); *G06F 8/61* (2013.01); *G06F 8/65* (2013.01); *G06F 8/64* (2013.01)

(58) Field of Classification Search
CPC . G06F 8/67; G06F 8/68; G06F 11/143; G06F 8/60–61; G06F 8/65–68; G06F 11/433; G06F 8/61–65
See application file for complete search history.

(56) References Cited

U.S. PATENT DOCUMENTS

| 4,954,941 | A | | 9/1990 | Redman |
| 5,155,837 | A | | 10/1992 | Liu et al. |
| 5,155,847 | A | | 10/1992 | Kirouac et al. |
| 5,274,808 | A | | 12/1993 | Miyao et al. |
| 5,359,730 | A | | 10/1994 | Marron |
| 5,511,194 | A | | 4/1996 | Shirakata et al. |
| 5,640,564 | A | | 6/1997 | Hamilton et al. |
| 5,682,533 | A | | 10/1997 | Siljestroemer |
| 5,721,907 | A | | 2/1998 | Pyne |
| 5,752,042 | A | | 5/1998 | Cole et al. |
| 5,835,911 | A | * | 11/1998 | Nakagawa ................ G06F 8/65 |
| 5,845,077 | A | | 12/1998 | Fawcett |
| 5,950,010 | A | | 9/1999 | Hesse et al. |
| 5,999,740 | A | | 12/1999 | Rowley |

(Continued)

OTHER PUBLICATIONS

Red Hat Command Center 3.18, Check Reference, Red Hat, Inc., 2007, 178 pages.

(Continued)

*Primary Examiner* — Duy Khuong T Nguyen
*Assistant Examiner* — Mohammad H Kabir
(74) *Attorney, Agent, or Firm* — Lowenstein Sandler LLP

(57) ABSTRACT

A method and apparatus for installing a network appliance. In one embodiment, the method includes copying an install image pertaining to the network appliance to an install staging area in a memory device of the network appliance, obtaining current installation object data from a server, and saving an up-to-date set of installation objects in the install staging area using the installation object data received from the server. The method may further include marking the install staging area as bootable, rebooting the network appliance, and installing from the install staging area onto the network appliance.

10 Claims, 7 Drawing Sheets

(56) References Cited

U.S. PATENT DOCUMENTS

| | | | |
|---|---|---|---|
| 6,009,274 | A | 12/1999 | Fletcher et al. |
| 6,038,568 | A | 3/2000 | McGrath et al. |
| 6,049,671 | A | 4/2000 | Slivka et al. |
| 6,070,012 | A | 5/2000 | Eitner et al. |
| 6,076,084 | A | 6/2000 | Harlan |
| 6,098,079 | A | 8/2000 | Howard |
| 6,101,327 | A | 8/2000 | Holte-Rost et al. |
| 6,154,747 | A | 11/2000 | Hunt |
| 6,237,092 | B1 | 5/2001 | Hayes, Jr. |
| 6,253,300 | B1 | 6/2001 | Lawrence et al. |
| 6,266,809 | B1 | 7/2001 | Craig et al. |
| 6,363,524 | B1 | 3/2002 | Loy |
| 6,463,584 | B1 | 10/2002 | Gard et al. |
| 6,477,703 | B1 | 11/2002 | Smith et al. |
| 6,493,871 | B1 * | 12/2002 | McGuire et al. ............ 717/173 |
| 6,513,050 | B1 | 1/2003 | Williams et al. |
| 6,513,115 | B2 | 1/2003 | Nock et al. |
| 6,634,025 | B1 | 10/2003 | Hauptmann et al. |
| 6,636,872 | B1 | 10/2003 | Heath et al. |
| 6,698,017 | B1 | 2/2004 | Adamovits et al. |
| 6,751,794 | B1 | 6/2004 | McCaleb et al. |
| 6,757,900 | B1 | 6/2004 | Burd et al. |
| 6,880,086 | B2 * | 4/2005 | Kidder ................. G06F 1/14 |
| | | | 713/177 |
| 7,145,682 | B2 | 12/2006 | Bolden |
| 7,188,163 | B2 | 3/2007 | Srinivasan et al. |
| 7,234,056 | B2 | 6/2007 | Talati et al. |
| 7,356,679 | B1 | 4/2008 | Le et al. |
| 7,478,381 | B2 | 1/2009 | Roberts et al. |
| 7,487,383 | B2 | 2/2009 | Bensinger |
| 7,512,635 | B1 | 3/2009 | Solin |
| 7,543,118 | B1 | 6/2009 | Chen et al. |
| 7,574,706 | B2 | 8/2009 | Meulemans et al. |
| 7,624,086 | B2 | 11/2009 | Keith, Jr. |
| 7,702,673 | B2 | 4/2010 | Hull et al. |
| 7,751,339 | B2 * | 7/2010 | Melton et al. ............... 370/252 |
| 7,756,826 | B2 | 7/2010 | Bots et al. |
| 7,877,357 | B1 | 1/2011 | Wu et al. |
| 7,900,056 | B1 | 3/2011 | Murphy, Jr. |
| 7,925,711 | B1 | 4/2011 | Gopalan et al. |
| 7,937,699 | B2 | 5/2011 | Schneider |
| RE42,685 | E * | 9/2011 | Oesterreicher ............ G06F 8/67 |
| | | | 348/E5.008 |
| 8,146,076 | B1 * | 3/2012 | Shumway ................. G06F 8/63 |
| | | | 717/168 |
| 8,276,136 | B2 | 9/2012 | Schneider |
| 8,301,874 | B1 * | 10/2012 | Heidingsfeld .... G06F 17/30168 |
| | | | 713/1 |
| 8,407,682 | B2 * | 3/2013 | Reisman ..................... 717/168 |
| 8,418,164 | B2 | 4/2013 | Schneider |
| 8,458,144 | B2 * | 6/2013 | Maydew et al. ............. 707/692 |
| 8,589,592 | B2 | 11/2013 | Schneider |
| 8,683,458 | B2 | 3/2014 | Schneider |
| 2002/0085028 | A1 | 7/2002 | Tabatabai et al. |
| 2002/0087668 | A1 | 7/2002 | San Martin et al. |
| 2002/0100036 | A1 | 7/2002 | Moshir et al. |
| 2002/0124245 | A1 | 9/2002 | Maddux et al. |
| 2003/0037326 | A1 | 2/2003 | Burkhardt et al. |
| 2003/0097553 | A1 * | 5/2003 | Frye, Jr. ..................... 713/2 |
| 2003/0188227 | A1 | 10/2003 | Maison et al. |
| 2003/0225797 | A1 | 12/2003 | Shields et al. |
| 2004/0003266 | A1 * | 1/2004 | Moshir ..................... G06F 8/65 |
| | | | 713/191 |
| 2004/0008205 | A1 | 1/2004 | O'Neill |
| 2004/0019823 | A1 | 1/2004 | Gere |
| 2004/0019889 | A1 * | 1/2004 | Melchione ............. H04L 67/34 |
| | | | 717/177 |
| 2004/0040021 | A1 | 2/2004 | Bharati et al. |
| 2004/0153478 | A1 | 8/2004 | Igouchkine |
| 2004/0181790 | A1 * | 9/2004 | Herrick ..................... 717/168 |
| 2004/0215755 | A1 * | 10/2004 | O'Neill ................. G06F 8/654 |
| | | | 709/223 |
| 2005/0055595 | A1 | 3/2005 | Frazer et al. |
| 2005/0071839 | A1 * | 3/2005 | Kim ..................... G06F 8/65 |
| | | | 717/170 |
| 2005/0080823 | A1 | 4/2005 | Collins |
| 2005/0132359 | A1 | 6/2005 | McGuire et al. |
| 2005/0198239 | A1 | 9/2005 | Hughes |
| 2005/0273472 | A1 | 12/2005 | Reddy et al. |
| 2006/0004832 | A1 * | 1/2006 | Langsford et al. ........... 707/102 |
| 2006/0031934 | A1 * | 2/2006 | Kriegel ..................... 726/22 |
| 2006/0064459 | A1 | 3/2006 | Matsushima |
| 2006/0075001 | A1 * | 4/2006 | Canning ................. G06F 8/65 |
| 2006/0080385 | A1 * | 4/2006 | Blandford ............ G06F 9/4416 |
| | | | 709/203 |
| 2006/0089954 | A1 | 4/2006 | Anschutz |
| 2006/0130045 | A1 | 6/2006 | Wesley et al. |
| 2006/0149806 | A1 | 7/2006 | Scott et al. |
| 2006/0195816 | A1 | 8/2006 | Grandcolas et al. |
| 2007/0027964 | A1 * | 2/2007 | Herrod ................ H04L 41/0889 |
| | | | 709/220 |
| 2007/0143392 | A1 | 6/2007 | Choe et al. |
| 2007/0168398 | A1 * | 7/2007 | Miroshnichenko ..... G06F 16/10 |
| 2007/0255530 | A1 | 11/2007 | Wolf |
| 2007/0294368 | A1 | 12/2007 | Bomgaars et al. |
| 2008/0046675 | A1 * | 2/2008 | Okada ................... G06F 3/0616 |
| | | | 711/173 |
| 2008/0098383 | A1 * | 4/2008 | Waldmann ............... G06F 8/68 |
| | | | 717/170 |
| 2008/0294678 | A1 | 11/2008 | Gorman et al. |
| 2008/0295092 | A1 | 11/2008 | Tan et al. |
| 2008/0306883 | A1 * | 12/2008 | Baffier ................... G06F 8/61 |
| | | | 705/400 |
| 2008/0306986 | A1 | 12/2008 | Doyle, Sr. |
| 2009/0144722 | A1 | 6/2009 | Schneider |
| 2009/0300603 | A1 | 12/2009 | Schneider |
| 2012/0291021 | A1 * | 11/2012 | Banerjee et al. ............. 717/173 |

OTHER PUBLICATIONS

Red Hat Command Center, User Guide 3.18, Red Hat, Inc., 2007, 318 pages.

Red Hat Command Center, Release Notes 3.18, Red Hat, Inc., 2007, 7 pages.

Red Hat Command Center 3.18, Setup and Installation Guide, Red Hat, Inc., 2007, 33 pages.

Arora, et al., "An Empirical Analysis of Software Vendors' Patching Behavior: Impact of Vulnerablity Disclosure" Carnegie Mellon Univeristy, 2005, 33 pages.

Balani, et al., "Multi-Level Software Reconfiguation for Sensor Networks," ACM, 2006, 10 pages.

Dunkels, et al. "Run-Time Dynamic Linking for Reporgramming Wireless Sensor Networks," ACM 2006, 14 pages.

Shogan, et al., "Compact Binaries with Code Compression in a Sofrtware Dynamic Translator," IEEE, 2004, 6 pages.

USPTO; Notice of Allowance for U.S. Appl. No. 11/897,733, dated Dec. 27, 2010.

USPTO; Office Action for U.S. Appl. No. 11/998,552, dated Aug. 3, 2011.

USPTO; Final Office Action for U.S. Appl. No. 11/998,552, dated Jan. 3, 2012.

USPTO; Office Action for U.S. Appl. No. 11/998,552, dated Dec. 5, 2012.

USPTO, Final Office Action for U.S. Appl. No. 11/998,552 dated Mar. 27, 2013.

USPTO, Office Action for U.S. Appl. No. 11/998,552 dated Jul. 30, 2013.

USPTO, Notice of Allowance for U.S. Appl. No. 11/998,552 dated Nov. 18, 2013.

USPTO, Office Action for U.S. Appl. No. 12/156,248, dated Aug. 26, 2011.

USPTO, Final Office Action for U.S. Appl. No. 12/156,248, dated Jan. 27, 2012.

USPTO, Notice of Allowance for U.S. Appl. No. 12/156,248, dated May 1, 2012.

USPTO, Notice of Allowance for U.S. Appl. No. 12/156,248, dated Dec. 12, 2012.

(56) References Cited

OTHER PUBLICATIONS

WebHostingResourceKit, Web Hosting Reviews and Tutorials, "Apache HTTP Web server configuration" Tutorial http://www.webhostingresourcekit.com/239.html, Jul. 11, 2006, retrieved on Oct. 19, 2010, 5 pages.

\* cited by examiner

IMAGE INSTALL OF A NETWORK APPLIANCE

RELATED APPLICATIONS

This application is a continuation of U.S. patent application Ser. No. 12/156,248, filed May 29, 2008, and assigned to the assignee of the present application and is hereby incorporated by reference.

This application is related to U.S. patent application Ser. No. 11/897,733, Ser. No. 12/001,707, and Ser. No. 12/001,510, filed on Aug. 31, 2007, Dec. 11, 2007, and Dec. 11, 2007, respectively, and assigned to the assignee of the present application and hereby incorporated by reference.

TECHNICAL FIELD

Embodiments of the present invention relate to network appliances, and more specifically to the image installation of the network appliance.

BACKGROUND

Networked computers are used to transmit and fetch information to and from local sources (e.g., computers used in a business) and remote sources (e.g., enterprise services offered over the Internet). To ensure privacy and security during communication between networked computers, authentication and verification mechanisms may be used. Thus, the authentication and verification mechanisms can be used to establish a trusted session between a server and client. The trusted session can be used to manage installations for network appliances so that malicious software is less likely to be installed, and to provide assurances that the latest available software is installed.

Installation of software to a network device used as a network appliance (that is, installing a network appliance) may be performed by an operator downloading an image file of a software distribution on a machine-readable medium (such as a CD ROM or DVD ROM image file), preparing the image to be used on a machine-readable medium (for example, by creating a CD ROM or DVD ROM from the image), and using the prepared medium to start the network device. However, it may be that the operator has used an old or out of date image to prepare the medium, or the operator may use a previously prepared medium that is no longer current. If later versions of the software are not compatible with the version that is installed, it may not even be possible to subsequently upgrade the network appliance. Thus, a technique is needed to ensure that the software installed on the network appliance is up to date.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
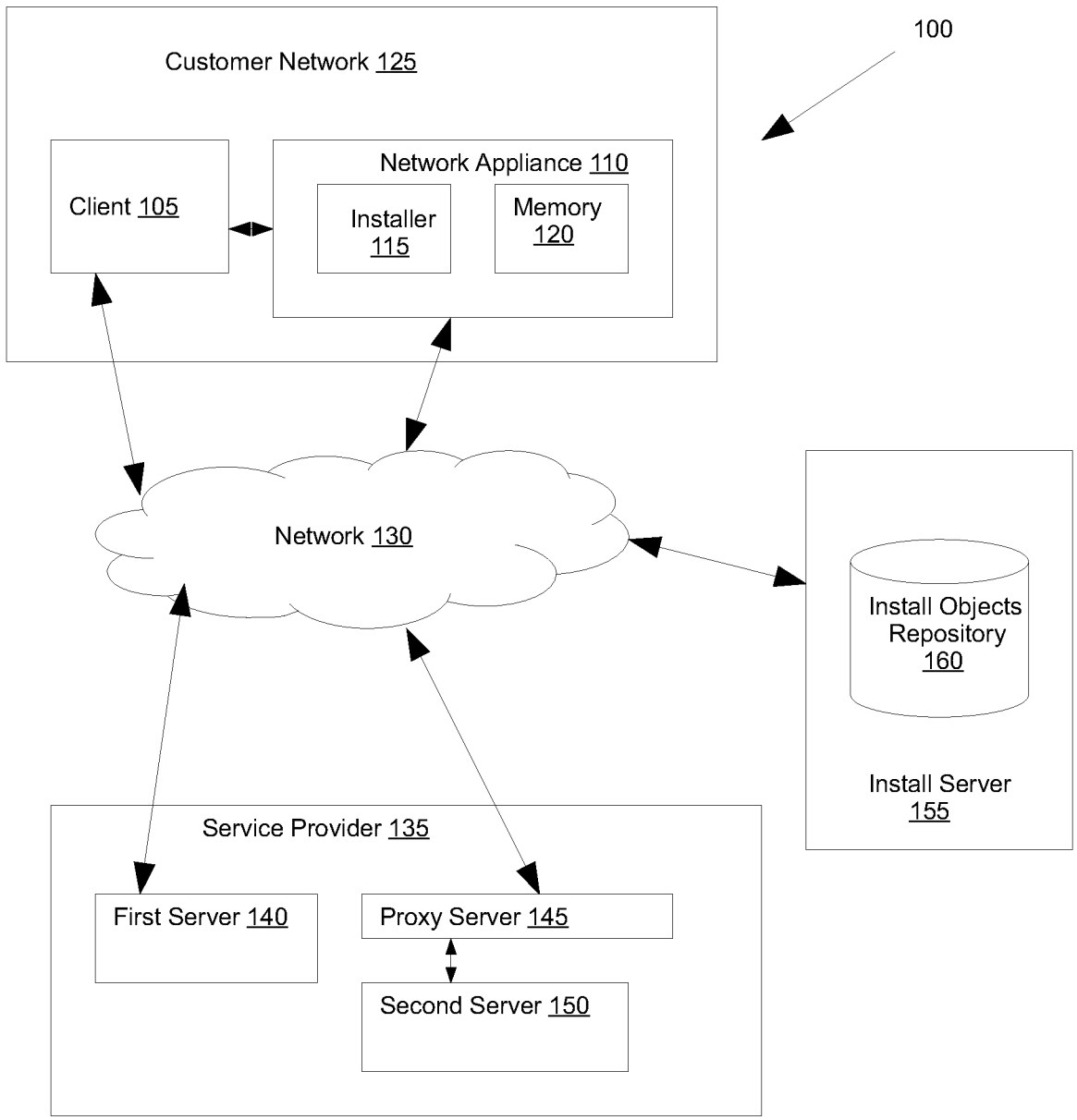
FIG. 1 illustrates an exemplary network architecture in which embodiments of the present invention may operate.

Described herein is a method and system for installing network appliances. In one embodiment, an install image pertaining to a network appliance is copied to an install staging area in a memory device of the network appliance. Current installation data is then obtained from a server. The current installation data may include current installation objects (e.g., software packages and data in a pre-installed state such as a collection of rules to specify a security policy of the network appliance, a collection of configuration items to configures the network appliance to perform application-specific tasks, etc.). Next, the current installation data received from the server is used to define an up-to-date set of installation objects, save it to the install staging area, and proceed with the installation from the install staging area onto the network appliance.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include a service provider 135 connected with a customer network 125 (e.g., a local area network (LAN), wide area network (WAN), intranet, etc.) over a public network 130 (e.g., the Internet). Alternatively, the customer network 125 may be connected with the service provider 135 via a private network (e.g., an intranet, virtual private network (VPN), etc.).

Referring to FIG. 1, the customer network 125 may represent a network of an enterprise and may include such devices as desktop computers, laptop computers, network printers, switches, routers, gateways, firewalls, or any other devices having a network address. In one embodiment, the customer network 125 also includes a client 105 and a network appliance 110. Client 105 may be a device operated by an IT administrator or some other user. The network appliance 110 may be a device that is configurable over a network. The client 105 and the network appliance 110 may each be a computing device such as, for example, a desktop computer, laptop computer, server, etc. In one embodiment, the network appliance 110 is configured to perform a network related function (e.g., network monitoring) upon connection with the customer network 125.

Service provider 135 provides one or more services to customer network 125. In one embodiment, service provider 135 uses the network appliance 110 to collect information about the customer network 125 and devices on the customer network 125. The service provider 135 then analyzes this information, and presents the analysis to a user such as an IT administrator (e.g., via client 105). Alternatively, the service provider 135 may provide other services, such as network indexing service, etc. The service provider 135 includes one or more servers such as first server 140, proxy server 145, and second server 150 that may reside on the same or different devices. Alternatively, other server configurations may be implemented (e.g., service provider 135 may include more or fewer servers, which may have redundant or different functionality).

First server 130 may be a front end server that provides an interface to client 105 of customer network 125. Through the first server 140, users of customer network 135 may request data, initiate actions, receive information, etc. Network appliance 110 may also communicate with first server 140, for example, to request a service, initiate an action, report data, etc. In one embodiment, first server 140 is a web application server that provides a web application interface accessible to client 105 via a web browser.

Second server 150 may be a back end server that communicates with the network appliance 110 of customer network 125 to send and/or receive such data as identity certificate information, network status updates, transactions, etc. Second server 150 may also communicate data to and/or from client 105. In one embodiment, second server 150 communicates with the network appliance 110 and/or client 105 through proxy server 145. Proxy server 145 receives transmissions and, if appropriate, forwards them to second server 150. Alternatively, no proxy server 145 may be present, or multiple proxy servers may be used.

Service provider 135 may provide an install server 155 that maintains a set of objects (e.g., installation objects) for installing the software of the network appliance 110. The install server 155 may be provided as part of service provider 135's network or as a separate server or group of servers coupled to the network appliance 110 via a network (e.g., network 130). The install server 155 may include, or have access (e.g., via a network) to, an install object repository 160, which may be a database, a file server, or other storage device or devices. The install object repository 160 may store installation objects for the network appliance 110 that may include, for example, software packages and data in a pre-installed state such as a collection of rules to specify a security policy of the network appliance, a collection of configuration items to configures the network appliance to perform application-specific tasks, etc. In addition, the install object repository 160 may store indexing information associated with the installation objects such as checksums, hashes, or other object fingerprints.

In one embodiment, the network appliance 110 hosts an installer 115 that communicates with the install server 155 to obtain up-to-date installation objects for the network appliance 110, as will be discussed in more detail below. A memory device 120 (such as a hard drive, flash drive, etc.) of the network appliance 110 can contain the installed software for the network appliance, and can be used by the installer 115 to hold both the installed software and installation objects used during installation. The installer 115 may cause an area of memory 120 (such as a partition or folder) to be reserved to contain installation objects. In one embodiment, the reserved area of memory 120 may also store fingerprints (e.g., checksums, hashes, and other signatures) of the installation objects residing in the memory 120.

As discussed above, the installation objects stored in memory 120 may be out of date if, for example, the operator has used an old or out-of-date image to prepare the medium (e.g., CD ROM or DVD ROM), or the operator has used a previously prepared medium that is no longer current. In order to ensure that the version being installed is up-to-date, the installer 115 contacts the install server 155 to obtain most recent installation objects. In one embodiment, the installer 115 obtains the most recent installation objects by providing a list of object fingerprints for all of the installation objects stored in memory 120. The install server 155 may compare the fingerprints it receives with the list of fingerprints of the installation objects from the install objects repository 160, and respond with a list of outdated fingerprints (those that do not correspond to any installation objects in the install objects repository 160), together with a list of installation objects not identified in the list of fingerprints provided by the installer 115. The installer 115 may then delete unrecognized installation objects corresponding to the list of outdated fingerprints provided by the install server 155, and save the new installation objects provided by the install server 155. The installer 115 may then again provide a list of fingerprints of the saved installation objects to the install server 155 to verify that all objects were received and stored successfully.

In another embodiment, the installer 115 does not copy any installation objects to memory 120. In this embodiment, the installer 115 obtains the most recent installation objects by providing an empty list of fingerprints to the install server 155. The install server 155 may then send an up-to-date list of installation objects to the installer 115, which will save these installation objects to the reserved area of memory 120. This embodiment may be used when it is desirable to distribute a smaller installation image.

Once the up-to-date installation objects are saved to the memory 120, the installer 115 marks the reserved area of the memory 120 as bootable, reboots the network appliance 110, and installs from the reserved area of the memory 120 onto the network appliance.

Figure 2:
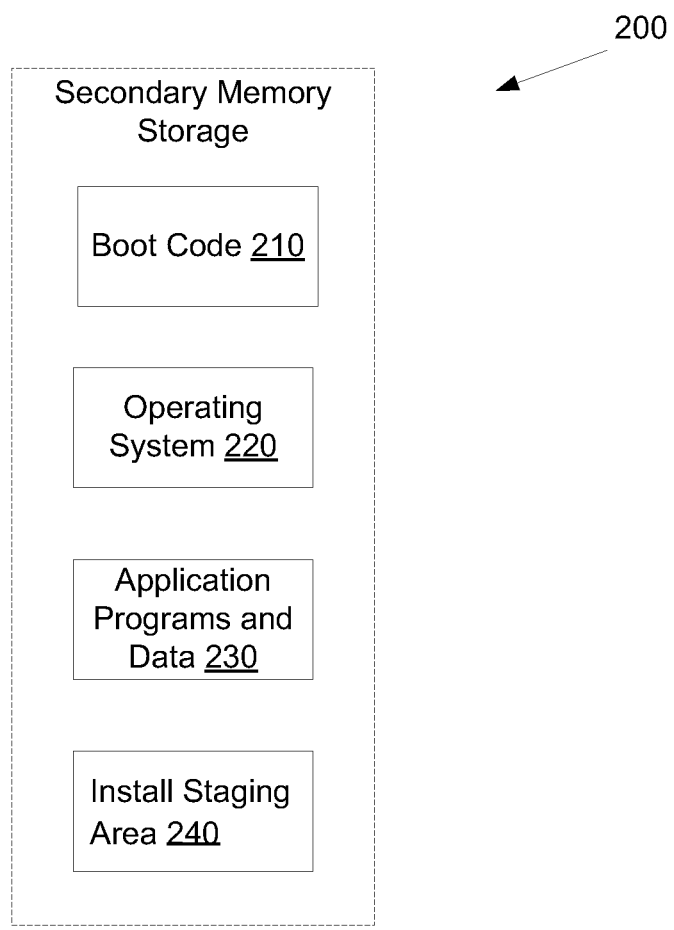
FIG. 2 is a schematic diagram illustrating a secondary memory storage device used for installing a network appliance, in accordance with one embodiment of the present invention.

FIG. 2 is a schematic diagram illustrating one embodiment of a memory device used for installing a network appliance. Secondary memory storage 200 is typically a bootable memory device such as a hard drive. Secondary memory storage 200 is usually divided into sections of reserved memory areas. The reserved memory areas can be demarcated as logical and/or physical partitions of a disk drive, memory banks, BLOBs (binary large objects) and the like.

Section 210 is reserved for use by a boot code routine, such as code contained within a boot sector of a hard drive. In various embodiments, a processor fetches a boot vector at boot time, which directs the processor program counter to execute a BIOS service to load the boot code routine from secondary memory storage 200 into a local (fast) memory. The boot code routine is executed by the processor to, for example, select and/or load an operating system.

Section 220 is reserved for storing the operating system code. The operating system is typically loaded into the processor local memory as described above, and then executed. Any portion of the operating system code can be combined with section 210, although typically the operating segment code remains segregated from the boot code routine.

Section 230 is reserved for use by application programs and data storage. The application programs typically run under the direction of the operating system and require memory in secondary memory storage 200 for storing data that is used by the application programs. Any portion of section 230 can be combined with section 220.

Section 240 is an install staging area used for storing information relating to the installation of the network appliance 110. For example, section 240 can be a swap partition re-purposed for the install process since there is no swapping during the install. Alternatively, section 240 can be a custom installer specifically reserved for the install process.

Figure 3A:
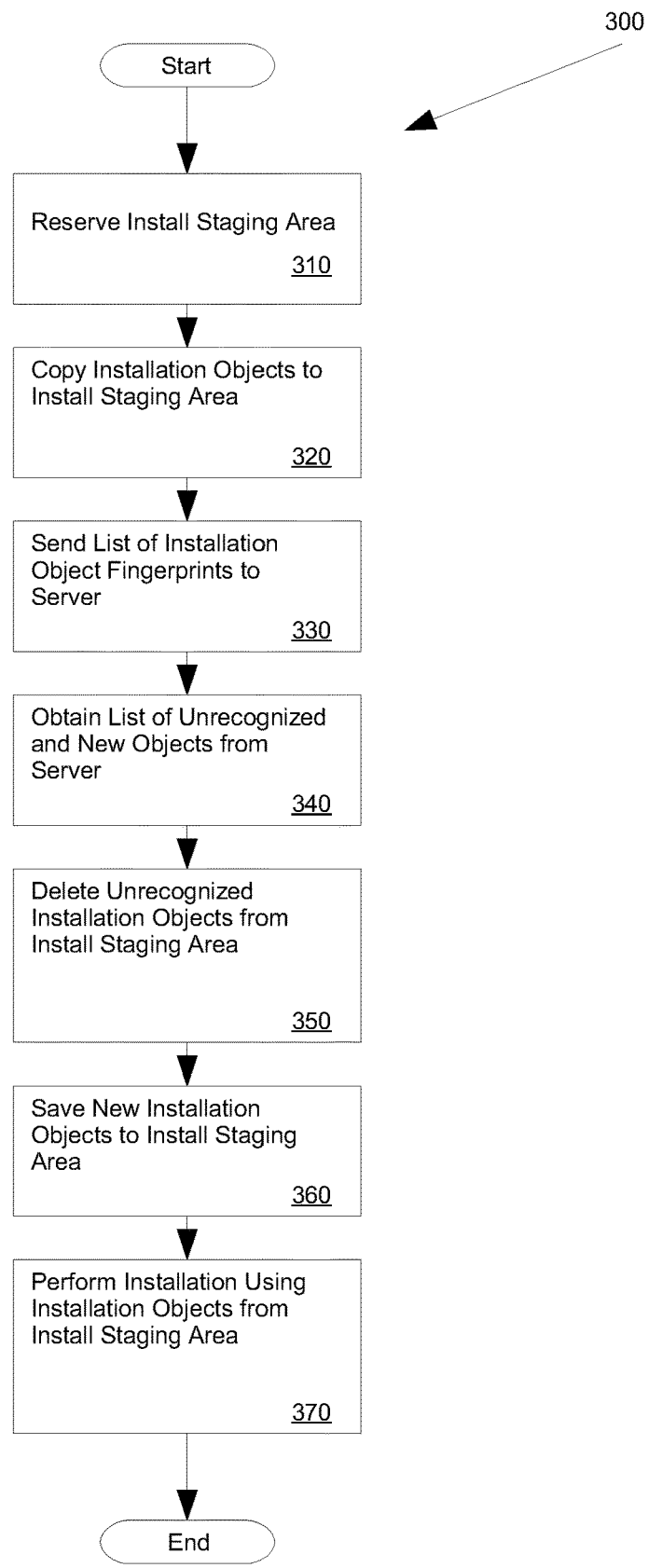
FIG. 3A is a flow diagram illustrating a client-side method for installing a network appliance, in accordance with one embodiment of the present invention.

FIG. 3A is a flow diagram illustrating one embodiment of a client-side method 300 for installing a network appliance. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 300 is performed by a network appliance, such as network appliance 110 of FIG. 1.

Referring to FIG. 3A, method 300 begins with processing logic reserving an install staging area in a memory device of the network appliance to store information relating to the installation. The install staging area can include, for example, a swap partition re-purposed for the install process due to the lack of swapping operations during the install, or a custom installer partition.

At block 320, processing logic copies a set of installation objects from an installation medium to the install staging area. The installation medium may be, for example, a CD ROM or DVD ROM having a network appliance image file (e.g., ISO file) previously downloaded by a user from the service provider's web site. In one embodiment, the installation objects are a collection of software packages in a pre-installed state that can be unpacked to create an executable image, and a set of configuration data.

At block 330, processing logic sends a list of fingerprints of the installation objects to a server. This list may be composed of a set of strings, each string representing the checksum or hash of an installation object. The list may be represented as a simple list or as a serialized object or array in some format (e.g., XML). The fingerprint may also include an object name (such as the name of a particular software package) and version information. In one embodiment, the fingerprints are created by processing logic. Alternatively, the fingerprints are contained in the image file, together with the installation objects.

At block 340, processing logic receives a list of fingerprints that correspond to installation objects unrecognized by the server, and a list of new installation objects with no matching fingerprints in the list sent to the server in block 330. The installation objects may be represented in a serialized form (for example, as XML documents or fragments), as CDATA sections in an XML document, as a multipart document encoding (such as a MIME multipart document) or in some other format.

At block 350, processing logic deletes installation objects that correspond to fingerprints unrecognized by the server from the install staging area. At block 360, processing logic saves installation objects provided by the server to the install staging area. Alternatively, block 350 may not be performed (e.g., if the list provided at block 330 does not include any unrecognized fingerprints) or block 360 may not be performed (e.g., if the collection of installation objects from the installation image is complete and up-to-date).

In one embodiment (not shown), if any new objects are saved to the install staging area, processing logic returns to block 330 to check that the new objects were correctly received.

At block 370, processing logic proceeds with the installation using the installation objects in the install staging area.

Figure 3B:
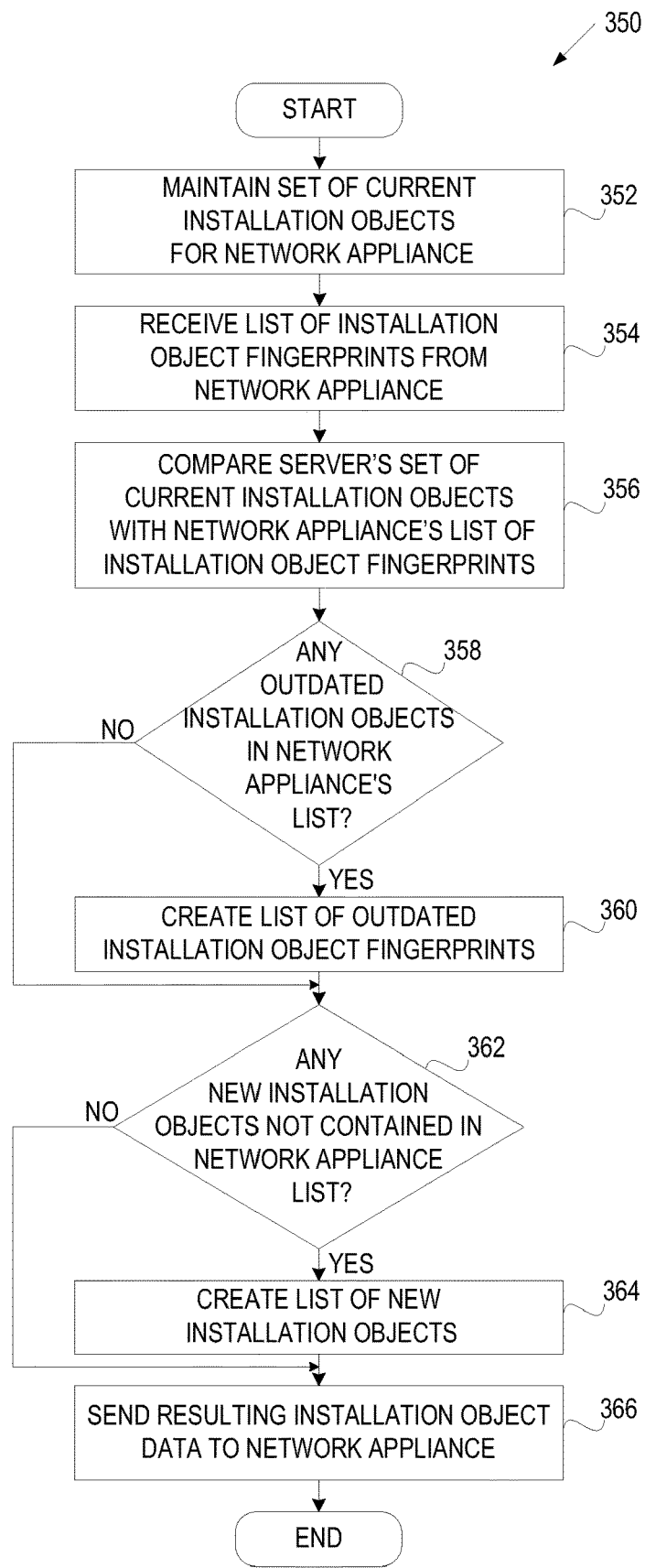
FIG. 3B is a flow diagram illustrating a server-side method for facilitating installation of a network appliance, in accordance with one embodiment of the present invention.

FIG. 3B is a flow diagram illustrating one embodiment of a server-side method 350 for facilitating installation of a network appliance. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 350 is performed by a server, such as install server 155 of FIG. 1.

Referring to FIG. 3B, method 350 begins with processing logic maintaining a list of up-to-date installation objects for a network appliance (block 352). In one embodiment, processing logic also maintains fingerprints of these installation objects. Alternatively, processing logic creates the fingerprints on the fly.

At block 354, processing logic receives, from a network appliance, a list of fingerprints of installation objects stored on the network appliance. At block 356, processing logic compares the received fingerprints with the fingerprints of the installation objects maintained at block 352. Based on this comparison, processing logic determines whether the list provided by the network appliance identifies any outdated installation objects (e.g., if processing logic cannot recognize any fingerprints in the network appliance's list) (block 358). If not, processing logic proceeds to block 362. If so, processing logic creates a list of fingerprints that correspond to installation objects that cannot be recognized (block 360), and proceeds to block 362.

At block 362, processing logic determines whether any up-to-date installation objects are missing from the network appliance's list. If not processing logic proceeds to block 366. If so, processing logic creates a list of new installation objects that have no matching fingerprints in the network appliance's list (block 364) and proceeds to block 366. The installation objects may be represented in a serialized form (for example, as XML documents or fragments), as CDATA sections in an XML document, as a multipart document encoding (such as a MIME multipart document) or in some other format.

At block 366, processing logic sends the resulting installation object data to the network appliance. The resulting installation object data may include a list of unrecognized fingerprints from the network appliance's list, and/or a list of new installation objects that were not identified in the network appliance's list.

Figure 4A:
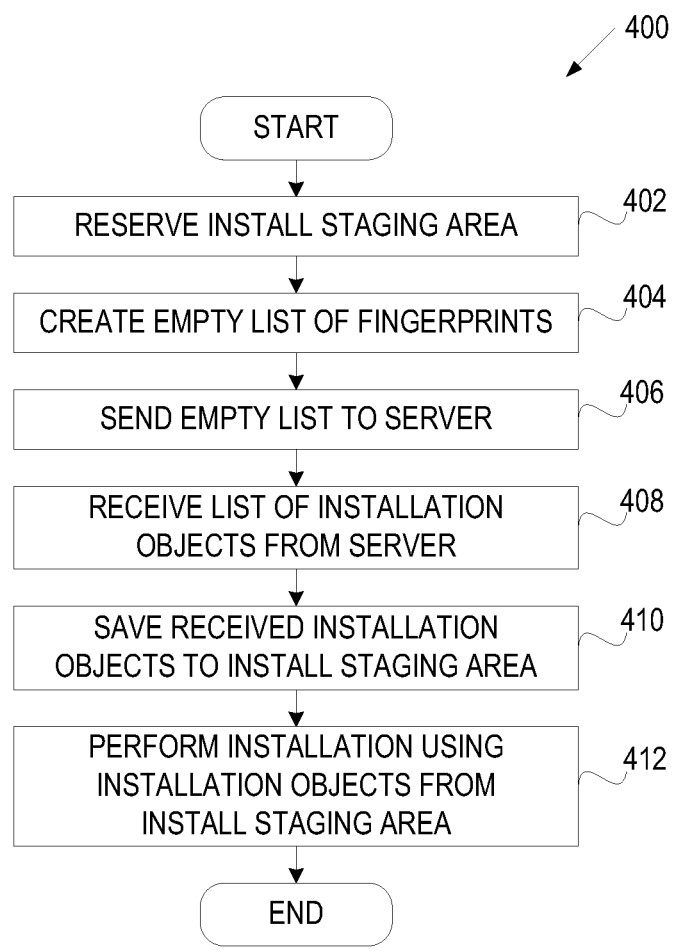
FIG. 4A is a flow diagram illustrating a client-side method for installing a network appliance, in accordance with another embodiment of the present invention.

FIG. 4A is a flow diagram illustrating an alternative embodiment of a client-side method 400 for installing a network appliance. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 400 is performed by a network appliance, such as network appliance 110 of FIG. 1.

Referring to FIG. 4A, method 400 begins with processing logic reserving an install staging area in a memory device of the network appliance to store information relating to the installation (block 402). At block 404, processing logic creates an empty list of installation object fingerprints. At block 406, processing logic sends the empty list of installation object fingerprints to a server.

At block 408, processing logic receives an up-to-date list of installation objects from the server. The installation objects may be represented in a serialized form (for example, as XML documents or fragments), as CDATA sections in an XML document, as a multipart document encoding (such as a MIME multipart document) or in some other format.

At block 410, processing logic saves installation objects provided by the server to the install staging area. In one embodiment (not shown), upon saving the installation objects to the install staging area, processing logic creates fingerprints of the installation objects and sends a list of these fingerprints to the server to ensure that the installation objects were correctly received.

At block 412, processing logic proceeds with the installation using the installation objects in the install staging area.

Figure 4B:
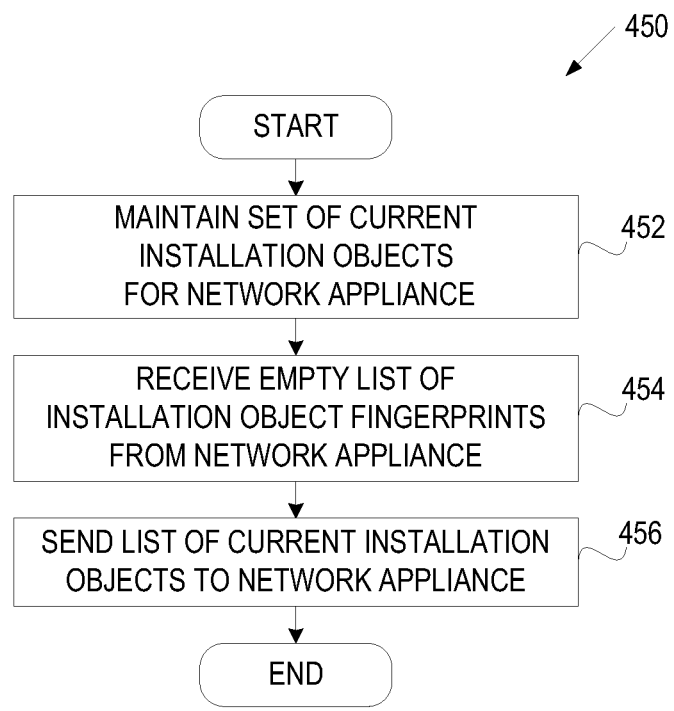
FIG. 4B is a flow diagram illustrating a server-side method for facilitating installation of a network appliance, in accordance with another embodiment of the present invention.

FIG. 4B is a flow diagram illustrating an alternative embodiment of a server-side method 450 for facilitating installation of a network appliance. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 450 is performed by a server, such as install server 155 of FIG. 1.

Referring to FIG. 4B, method 450 begins with processing logic maintaining a list of up-to-date installation objects for a network appliance (block 452). In one embodiment, processing logic also maintains fingerprints of these installation objects. Alternatively, processing logic creates the fingerprints on the fly.

At block 454, processing logic receives, from a network appliance, an empty list of fingerprints of installation objects. At block 456, processing logic creates a list of up-to-date installation objects and sends it to the network appliance. The installation objects may be represented in a serialized form (for example, as XML documents or fragments), as CDATA sections in an XML document, as a multipart document encoding (such as a MIME multipart document) or in some other format.

Figure 5:
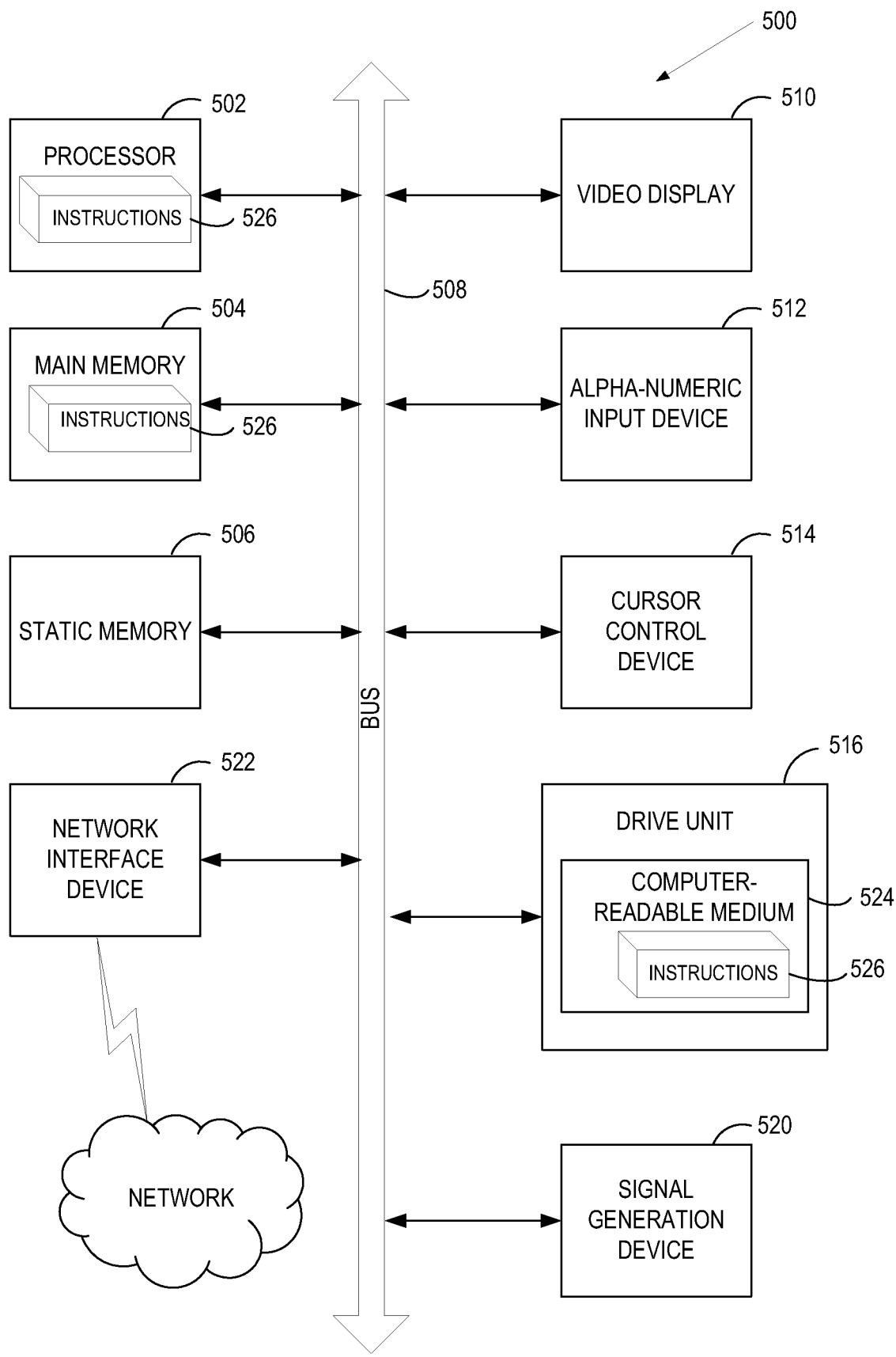
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   initiating an install process for a network appliance;
   identifying a lack of swapping operations associated with a swap partition of a memory of the network appliance during the install process;
   reserving an install staging area in the memory of the network appliance, the install staging area comprising the swap partition of the memory repurposed for the install process due to the lack of swapping operations;
   copying a plurality of installation objects from an installation medium to the install staging area of the memory of the network appliance, the installation medium having stored thereon a network appliance image file previously downloaded from a service provider, wherein the plurality of installation objects comprises a collection of software packages in a pre-installed state that can be unpacked to create an executable image and a set of configuration data associated with the collection of software packages;
   prior to installing the plurality of installation objects onto the network appliance, generating fingerprints of the plurality of installation objects in the install staging area, the fingerprints comprising object names and version information of the plurality of installation objects, and sending, to a server, a first list of the fingerprints of the plurality of installation objects in the install staging area, the first list comprising a set of strings, each string in the set of strings representing at least one of a checksum or a hash of a corresponding one of the plurality of installation objects;
   obtaining, from the server, installation object data comprising a second list of fingerprints that identifies an outdated installation object from the first list and a new installation object not already on the first list, wherein the installation object data is represented as at least one of serialized data, character data (CDATA) sections in an extensible markup language (XML) document, or a multipart document encoding;
   creating, by a processor in view of the installation object data, an updated set of installation objects in the install staging area of the memory of the network appliance by deleting the outdated installation object from the install staging area and adding the new installation object to the install staging area;
   sending, to the server and responsive to creating the updated set of installation objects, a third list of fingerprints of the updated set of installation objects in the install staging area, wherein the third list differs from the first list, the third list comprising an indication of the new installation object having been obtained and added to the install staging area and lacking an indication of the outdated installation object having been deleted from the install staging area;
   obtaining, from the server, an indication that the updated set of installation objects is complete and up to date;
   marking the install staging area as bootable;
   rebooting the network appliance; and
   installing, by the processor, the updated set of installation objects from the install staging area onto the network appliance.

2. The method of claim 1 wherein obtaining the installation object data from the server comprises:
   creating an empty list of installation object fingerprints;
   sending the empty list of installation object fingerprints to a server; and
   receiving a list of installation objects from the server.

3. The method of claim 1 wherein the updated set of installation objects comprises a software package in a pre-installed form.

4. A network appliance comprising:
   a memory; and
   a processor, operatively coupled to the memory, to:
      initiate an install process for the network appliance;
      identify a lack of swapping operations associated with a swap partition of the memory of the network appliance during the install process;
      reserve an install staging area in the memory of the network appliance, the install staging area comprising the swap partition of the memory repurposed for the install process due to the lack of swapping operations;
      copy a plurality of installation objects from an installation medium to the install staging area of the memory of the network appliance, the installation medium having stored thereon a network appliance image file previously downloaded from a service provider, wherein the plurality of installation objects comprises a collection of software packages in a pre-installed state that can be unpacked to create an executable image and a set of configuration data associated with the collection of software packages;

prior to installing the plurality of installation objects, generate fingerprints of the plurality of installation objects in the install staging area, the fingerprints comprising object names and version information of the plurality of installation objects, and send, to a server, a first list of the fingerprints of the plurality of installation objects in the install staging area, the first list comprising a set of strings, each string in the set of strings representing at least one of a checksum or a hash of a corresponding one of the plurality of installation objects;

obtain, from the server, installation object data comprising a second list of fingerprints that identifies an outdated installation object from the first list and a new installation object not already on the first list, wherein the installation object data is represented as at least one of serialized data, character data (CDATA) sections in an extensible markup language (XML) document, or a multipart document encoding;

create, in view of the installation object data, an updated set of installation objects in the install staging area of the memory by deleting the outdated installation object from the install staging area and adding the new installation object to the install staging area, send, to the server and responsive to creating the updated set of installation objects, a third list of fingerprints of the updated set of installation objects in the install staging area, wherein the third list differs from the first list, the third list comprising an indication of the new installation object having been obtained and added to the install staging area and lacking an indication of the outdated installation object having been deleted from the install staging area;

obtain, from the server, an indication that the updated set of installation objects is complete and up to date;

mark the install staging area as bootable, reboot the network appliance, and install the updated set of installation objects from the install staging area onto the network appliance.

5. The network appliance of claim 4 wherein to obtain the installation object data from the server, the processor to:
create an empty list of installation object fingerprints;
send the empty list of installation object fingerprints to a server; and
receive a list of installation objects from the server.

6. The network appliance of claim 4 wherein the installation object data comprises a set of installation objects in a serialized form.

7. The network appliance of claim 6 wherein the serialized form comprises at least one of:
an XML document;
a character data (CDATA) section of an XML document; or
a multipart Multipurpose Internet Mail Extensions (MIME) encoded document.

8. A non-transitory computer-readable storage medium, having instructions stored therein, which when executed, cause a processor to:
initiate an install process for a network appliance;
identify a lack of swapping operations associated with a swap partition of a memory of the network appliance during the install process;
reserve an install staging area in the memory of the network appliance, the install staging area comprising the swap partition of the memory repurposed for the install process due to the lack of swapping operations;
copy a plurality of installation objects from an installation medium to the install staging area of the memory of the network appliance, the installation medium having stored thereon a network appliance image file previously downloaded from a service provider, wherein the plurality of installation objects comprises a collection of software packages in a pre-installed state that can be unpacked to create an executable image and a set of configuration data associated with the collection of software packages;

prior to installing the plurality of installation objects onto the network appliance, generate fingerprints of the plurality of installation objects in the install staging area, the fingerprints comprising object names and version information of the plurality of installation objects, and send, to a server, a first list of the fingerprints of the plurality of installation objects in the install staging area, the first list comprising a set of strings, each string in the set of strings representing at least one of a checksum or a hash of a corresponding one of the plurality of installation objects;

obtain, from the server, installation object data comprising a second list of fingerprints that identifies an outdated installation object from the first list and a new installation object not already on the first list, wherein the installation object data is represented as at least one of serialized data, character data (CDATA) sections in an extensible markup language (XML) document, or a multipart document encoding;

create, by the processor in view of the installation object data, an updated set of installation objects in the install staging area of the memory of the network appliance by deleting the outdated installation object from the install staging area and adding the new installation object to the install staging area;

send, to the server and responsive to creating the updated set of installation objects, a third list of fingerprints of the updated set of installation objects in the install staging area, wherein the third list differs from the first list, the third list comprising an indication of the new installation object having been obtained and added to the install staging area and lacking an indication of the outdated installation object having been deleted from the install staging area;

obtain, from the server, an indication that the updated set of installation objects is complete and up to date;

mark the install staging area as bootable;

reboot the network appliance; and install, by the processor, the updated set of installation objects from the install staging area onto the network appliance.

9. The non-transitory computer-readable storage medium of claim 8 wherein to obtain the installation object data from the server, the processor to:
create an empty list of installation object fingerprints;
send the empty list of installation object fingerprints to a server; and
receive a list of installation objects from the server.

10. The non-transitory computer-readable storage medium of claim 8 wherein the updated set of installation objects comprises a software package in a preinstalled form.

* * * * *